United States Patent
Okamoto et al.

(10) Patent No.: US 11,999,083 B2
(45) Date of Patent: Jun. 4, 2024

(54) RESIN MOLDING APPARATUS AND METHOD FOR PRODUCING RESIN MOLDED PRODUCT

(71) Applicant: TOWA CORPORATION, Kyoto (JP)

(72) Inventors: Ryota Okamoto, Kyoto (JP); Keita Mizuma, Kyoto (JP)

(73) Assignee: TOWA CORPORATION, Kyoto (JP)

( * ) Notice: Subject to any disclaimer, the term of this patent is extended or adjusted under 35 U.S.C. 154(b) by 0 days.

(21) Appl. No.: 17/411,166

(22) Filed: Aug. 25, 2021

(65) Prior Publication Data

US 2022/0063150 A1 Mar. 3, 2022

(30) Foreign Application Priority Data

Aug. 28, 2020 (JP) ................. 2020-144746

(51) Int. Cl.
*B29C 43/18* (2006.01)
*B29C 43/34* (2006.01)
*B29C 43/58* (2006.01)

(52) U.S. Cl.
CPC .............. *B29C 43/18* (2013.01); *B29C 43/34* (2013.01); *B29C 43/58* (2013.01); *B29C 2043/181* (2013.01); *B29C 2043/5875* (2013.01)

(58) Field of Classification Search
None
See application file for complete search history.

(56) References Cited

U.S. PATENT DOCUMENTS

2009/0200704 A1  5/2009  Yamada et al.

FOREIGN PATENT DOCUMENTS

| JP | 2007-111862 A | 5/2007 |
|---|---|---|
| JP | 2012-126075 A | 7/2012 |
| JP | 2015-520 A | 1/2015 |
| JP | 2015208959 A | * 11/2015 |
| KR | 101982739 B1 | 5/2019 |
| KR | 10-2019-0114753 A | 10/2019 |
| TW | I337929 B | 3/2011 |
| WO | 2009/034845 A1 | 3/2009 |

OTHER PUBLICATIONS

Machine Translation of JP2015-208959 (Year: 2015).*
Office Action dated Apr. 13, 2022 in Taiwan appln. No. 110130542.
Office Action dated Nov. 1, 2022 in Korean appln. No. 10-2021-0111413.
Office Action dated Aug. 29, 2023 in Japanese appln. 2020-144746 with translation.

* cited by examiner

Primary Examiner — Robert J Grun
(74) Attorney, Agent, or Firm — Dilworth & Barrese, LLP (57) ABSTRACT

A resin molding apparatus includes: a resin supply mechanism including a nozzle for ejecting liquid resin to a supply target; a resin collection unit including: a resin-receiving member configured to receive a portion of the liquid resin which portion has dropped from the nozzle; and a movement mechanism configured to cause the resin-receiving member to move in such a manner as to follow the nozzle while keeping the resin-receiving member under the nozzle; a mold die including an upper die and a lower die facing the upper die; a mold clamp mechanism configured to clamp the mold die with the supply target between the upper die and the lower die; and a control section configured to control at least respective operations of the resin supply mechanism and the resin collection unit.

8 Claims, 6 Drawing Sheets

RESIN MOLDING APPARATUS AND METHOD FOR PRODUCING RESIN MOLDED PRODUCT

CROSS REFERENCE TO RELATED APPLICATION

This application is based on and claims priority under 35 U.S.C. Section 119 to Japanese Patent Application No. 2020-144746 filed on Aug. 28, 2020, the entire content of which are incorporated herein by reference.

TECHNICAL FIELD

This disclosure relates to a resin molding apparatus and a method for producing a resin molded product.

BACKGROUND ART

Substrates with semiconductor chips mounted thereon, for example, are typically sealed up in resin for use as electronic parts. There have been known, as resin molding apparatuses for sealing up substrates in resin, those including a resin supply mechanism that includes a nozzle from which to eject liquid resin onto a substrate as a supply target (see, for example, Japanese Unexamined Patent Application Publications JP2007-111862A and JP2012-126075A).

JP2007-111862A discloses a technique of supplying liquid resin onto a substrate in a vacuum chamber from a nozzle placed therein, moving the nozzle above out of the vacuum chamber, and then causing a resin-receiving container to receive liquid resin dropping from the tip of the nozzle. JP2007-111862A also discloses a technique of, before supplying liquid resin onto the substrate again, ejecting liquid resin from the nozzle into the resin-receiving container several times to prevent entry of air into the nozzle.

JP2012-126075A discloses a resin supply mechanism to which a replaceable syringe with a nozzle is attachable, and also discloses a technique of, before starting to use a replacement syringe, causing a rotation mechanism to rotate a trial ejection cup to a position under the nozzle and discarding into the trial ejection cup that portion of liquid resin which is at the tip of the nozzle and which is poor in quality. JP2012-126075A also discloses a technique of, after supplying liquid resin onto a substrate, moving the nozzle upward and downward to cause a string-shaped resin remainder on the nozzle to drop therefrom onto a substrate.

SUMMARY

The resin molding apparatus disclosed in JP2007-111862A involves the following issue: While the nozzle is being moved above out of the vacuum chamber after supplying liquid resin onto a substrate, the nozzle may let liquid resin unintentionally drop onto and adhere to the substrate to cause irregularity in how liquid resin is present on the substrate. The resin molding apparatus disclosed in JP2012-126075A involves the following issue: Since the nozzle is moved upward and downward to cause liquid resin on the nozzle to drop therefrom onto the substrate, a difference between the amount of liquid resin actually dropped from the nozzle and a designed value may cause irregularity in how liquid resin is present on the substrate.

The above circumstances have led to a demand for a resin molding apparatus and a method for producing a resin molded product each of which allows liquid resin to be supplied to an object to be supplied accurately.

A resin molding apparatus according to this disclosure characteristically includes: a resin supply mechanism including a nozzle for ejecting liquid resin to a supply target; a resin collection unit including: a resin-receiving member configured to receive a portion of the liquid resin which portion has dropped from the nozzle; and a movement mechanism configured to cause the resin-receiving member to move in such a manner as to follow the nozzle while keeping the resin-receiving member under the nozzle; a mold die including an upper die and a lower die facing the upper die; a mold clamp mechanism configured to clamp the mold die with the supply target between the upper die and the lower die; and a control section configured to control at least respective operations of the resin supply mechanism and the resin collection unit.

A method according to this disclosure for producing a resin molded product is characteristically a method for producing a resin molded product with use of the above resin molding apparatus, the method including: supplying the liquid resin to the supply target with use of the resin supply mechanism; collecting, with use of the resin collection unit, a portion of the liquid resin which portion has unintentionally dropped from the nozzle after the supplying; and producing a resin molded product with use of the liquid resin supplied with use of the resin supply mechanism.

DESCRIPTION OF EMBODIMENTS

Figure 1:
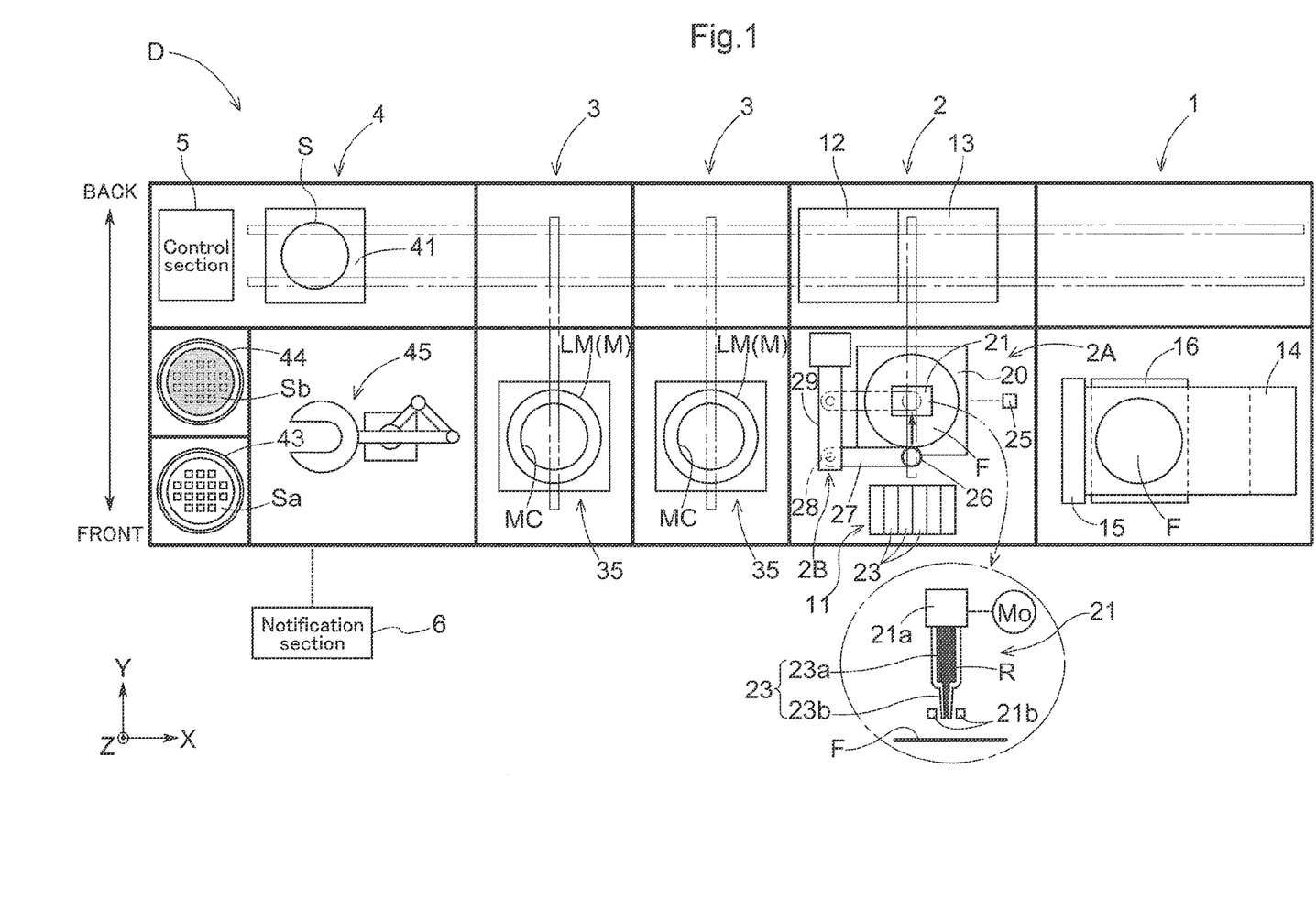
FIG. 1 is a diagram schematically illustrating a resin molding apparatus.

The description below deals with a resin molding apparatus and a method for producing a resin molded product as embodiments of this disclosure with reference to drawings. The embodiments described involve, as an example resin molding apparatus, a resin molding apparatus D including a resin supply module 2 as illustrated in FIG. 1. This disclosure is, however, not limited to the embodiments below, and may be altered variously as long as such alteration falls within the scope of this disclosure.

[Apparatus Configuration]

Substrates with semiconductor chips mounted thereon, for example, are sealed up in resin for use as electronic parts. An object to be molded is sealed up in resin by, for example, a compression method (compression molding) or transfer method. An example of the compression method is a resin sealing method that includes supplying liquid resin onto a release film, placing the release film onto a lower die of a mold die, and immersing an object to be molded into the liquid resin on the release film for resin molding. The resin molding apparatus D as the present embodiment uses the compression method. The resin supply module 2 is configured to supply liquid resin onto, for example, a mold die, a substrate (which is an example of the "supply target"), or a release film F (which is an example of the "supply target"). The description below is based on the premise that the supply target, onto which the resin supply module 2 supplies liquid resin R, is a release film F and that the object to be molded is, as an example, a substrate S with semiconductor chips (hereinafter referred to also as "chips") mounted thereon. Further, the gravitational direction corresponds to the downward direction, whereas the direction opposite to the gravitational direction corresponds to the upward direction. FIG. 1 shows a Z direction as an up-down direction.

FIG. 1 is a diagram schematically illustrating the resin molding apparatus D. The resin molding apparatus D as the present embodiment includes a release-film cutting module 1, a resin supply module 2, a plurality of (two for the present embodiment) compression-molding modules 3, a conveying module 4, a control section 5, and a notification section 6. The release-film cutting module 1, the resin supply module 2, the plurality of compression-molding modules 3, and the conveying module 4 are independently attachable to and detachable from one another. The present embodiment includes two compression-molding modules 3, but may alternatively include one compression-molding module 3 or three or more compression-molding modules 3.

The release-film cutting module 1 is configured to cut off, from a long film, a portion with a circular shape in a plan view as a release film F. The release-film cutting module 1 includes a film roll 14, a film gripper 15, and a film placement mechanism 16. The film gripper 15 holds an end of a film from the film roll 14 and unwinds the film roll 14. The film placement mechanism 16 cuts off a release film F with a circular shape in a plan view from the film roll 14 with use of a cutter (not illustrated in the drawings).

The resin supply module 2 includes a resin supply mechanism 2A and a resin collection unit 2B. The resin supply mechanism 2A is configured to supply liquid resin R for resin molding onto a resin supply area of the release film F. The resin collection unit 2B is configured to, after the resin supply mechanism 2A supplies liquid resin R onto the release film F, collect liquid resin R remaining on the resin supply mechanism 2A to prevent the remaining liquid resin R from dropping onto the release film F. The term "liquid resin R" as used herein refers to resin that is in the liquid state at normal temperature (room temperature). Liquid resin R may be a thermoplastic resin or a thermosetting resin. A thermosetting resin, which is in the liquid state at normal temperature, has a viscosity that becomes decreased when the thermosetting resin is heated. Continuing to heat a thermosetting resin polymerizes and cures the thermosetting resin into a cured resin. The liquid resin R for the present embodiment is preferably a thermosetting resin having a relatively high viscosity that does not allow the thermosetting resin to flow easily at normal temperature.

The resin supply mechanism 2A includes a table 20 on which to place the release film F received from the release-film cutting module 1, an ejection mechanism 21 configured to eject liquid resin R onto the release film F, and a weight sensor 25. The release film F received from the release-film cutting module 1 is held on the upper surface of the table 20 as the release film F is pulled by a suction mechanism (not illustrated in the drawings).

The ejection mechanism 21 includes a dispenser unit 21a to which a cartridge 23 with a nozzle 23b is attachable and a clamp mechanism 21b configured to clamp the tip of the nozzle 23b. The dispenser unit 21a includes a press member (not illustrated in the drawings) for pushing liquid resin R out of a syringe 23a (described later). The dispenser unit 21a moves the press member downward to supply a predetermined amount of liquid resin R out of the cartridge 23 onto the release film F. The dispenser unit 21a, to which the cartridge 23 is attachable, is movable on an XY plane (horizontally) parallel to the surface on which the release film F is placed. The dispenser unit 21a is also movable in the Z direction (up-down direction). The clamp mechanism 21b includes a pair of clamp members configured to pinch the tip of the nozzle 23b to block the nozzle 23b. In addition to or in place of the dispenser unit 21a, the table 20 may be movable on an XY plane. The dispenser unit 21a may be driven by any driving source. The driving source may be, for example, an electric motor such as a servomotor Mo. The clamp mechanism 21b may be operated by means of the fluid pressure of, for example, air supplied into a cylinder (not illustrated in the drawings) of the clamp mechanism 21b.

The cartridge 23 includes a syringe 23a containing liquid resin R and a nozzle 23b for ejecting the liquid resin R. The resin supply module 2 includes a resin storage 11 capable of storing a plurality of (six for the present embodiment) cartridges 23 in advance. The dispenser unit 21a is configured to, when it has used up all liquid resin R contained in a cartridge 23, automatically replace the cartridge 23 with a new cartridge 23.

The weight sensor 25 is configured to measure, for example, the weight of liquid resin R supplied on the release film F or the weight of a resin-receiving cup 26 (described later). The weight sensor 25 is a publicly known load sensor. The weight sensor 25 measures the weight of supplied liquid resin R on the basis of the difference between the weight of the release film F on which resin has been supplied and the weight of the release film F on which resin has not been supplied. The weight sensor 25 also measures the weight of collected liquid resin R on the basis of the difference between the weight of the resin-receiving cup 26 on which resin has been collected and the weight of the resin-receiving cup 26 on which resin has not been collected.

The resin molding apparatus D includes a resin loader 12 and rails for the resin loader 12. The resin loader 12 is movable on rails in the X direction between the release-film cutting module 1, the resin supply module 2, and the two compression-molding modules 3. The resin loader 12 is also movable on a rail in the Y direction inside each of the resin supply module 2 and the two compression-molding modules 3. The resin loader 12 is capable of conveying a release film F cut off by the release-film cutting module 1 to the resin supply module 2, and is also capable of holding the release film F on which liquid resin R has been supplied by the resin supply mechanism 2A and conveying the release film F to the compression-molding modules 3. The resin molding apparatus D includes a clearing mechanism 13 configured to move together with the resin loader 12. The clearing mechanism 13 is capable of removing a used release film F from each compression-molding module 3 and discarding the used release film F at a discard section (not illustrated in the drawings) of the release-film cutting module 1.

The resin collection unit 2B includes (i) a resin-receiving cup 26 (which is an example of the "resin-receiving member") configured to receive liquid resin R dropping from the nozzle 23b, (ii) an arm 27 holding the resin-receiving cup 26, (iii) a rotation mechanism 28 configured to rotate the arm 27 on an XY plane, and (iv) a movement mechanism 29 configured to cause the resin-receiving cup 26 to move in such a manner as to follow the nozzle 23b while keeping the resin-receiving cup 26 under the nozzle 23b (with use of a front-back movement mechanism 29a in particular). The resin collection unit 2B is supported by the housing of the resin supply module 2. The resin collection unit 2B is detailed later.

The compression-molding modules 3 each include at least a mold die M and a mold clamp mechanism 35 configured to clamp the mold die M. The compression-molding modules 3 are detailed later.

The conveying module 4 is configured to convey (i) a resin-sealing target substrate Sa (a substrate before being molded) that is provided with chips mounted thereon and that has not been sealed up in resin and (ii) a resin-sealed substrate Sb (resin molded product) that has been sealed up in resin. The conveying module 4 includes a substrate loader 41, a first container section 43 configured to store resin-sealing target substrates Sa, a second container section 44 configured to store resin-sealed substrates Sb, and a robot arm 45. The robot arm 45 is present inside the conveying module 4, and is capable of giving a resin-sealing target substrate Sa to the substrate loader 41 and receiving from the substrate loader 41 a resin-sealed substrate Sb that has been conveyed to the conveying module 4. The substrate loader 41 is movable in the X and Y directions inside the conveying module 4 and each of the compression-molding modules 3.

The conveying module 4 further includes a check mechanism (not illustrated in the drawings). The check mechanism is configured to check in which area chips are present on the substrate S (resin-sealing target substrate Sa) as an object to be molded at the compression-molding modules 3. The check mechanism causes a laser displacement gauge to scan the surface of the substrate S to check whether chips are actually present in that area for chips which the check mechanism is intended to check, and thereby stores information on the area in which chips are present and the area in which no chips are present. The check mechanism may alternatively cause, for example, a visible-light camera to capture an image of the surface of the substrate S and check the area for chips on the substrate S on the basis of the captured image.

Figure 6:
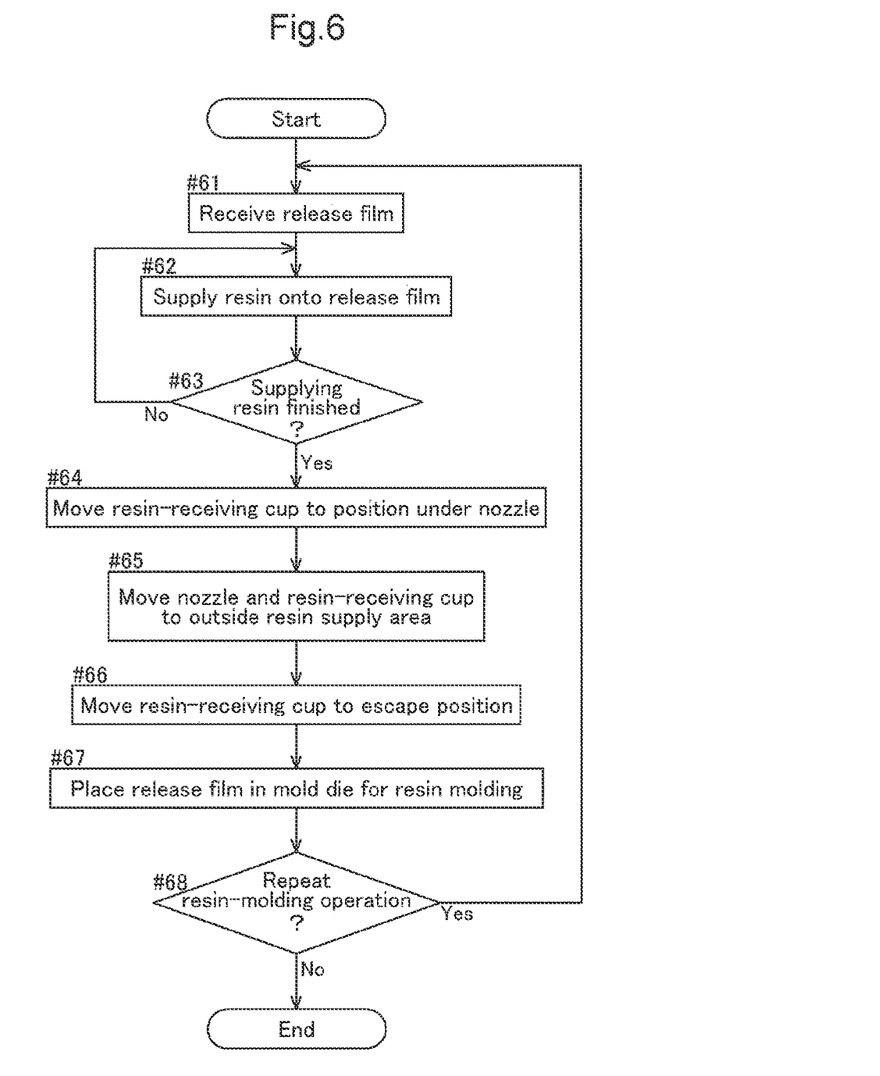
FIG. 6 is a flowchart of a resin supply procedure.

The control section 5 includes a processor including an application-specific integrated circuit (ASIC), a field-programmable gate array (FPGA), a central processing unit (CPU), or other hardware for a computer. The control section 5 also includes programs stored on hardware such as a hard disc drive (HHD) or a memory as software for controlling how the resin molding apparatus D is operated. The processor executes, for example, the above programs as shown in the flowchart of FIG. 6. The notification section 6 includes, for example, a display and/or a warning lamp present in front of the conveying module 4 and configured to notify the operator about how the resin molding apparatus D is operated. The notification section 6 for the present embodiment is configured to notify the operator of a malfunction of the resin collection unit 2B in particular. A later description of the present embodiment will deal with how the control section 5 and the notification section 6 function in relation to the operation of the resin supply module 2 as an example.

Figure 2:
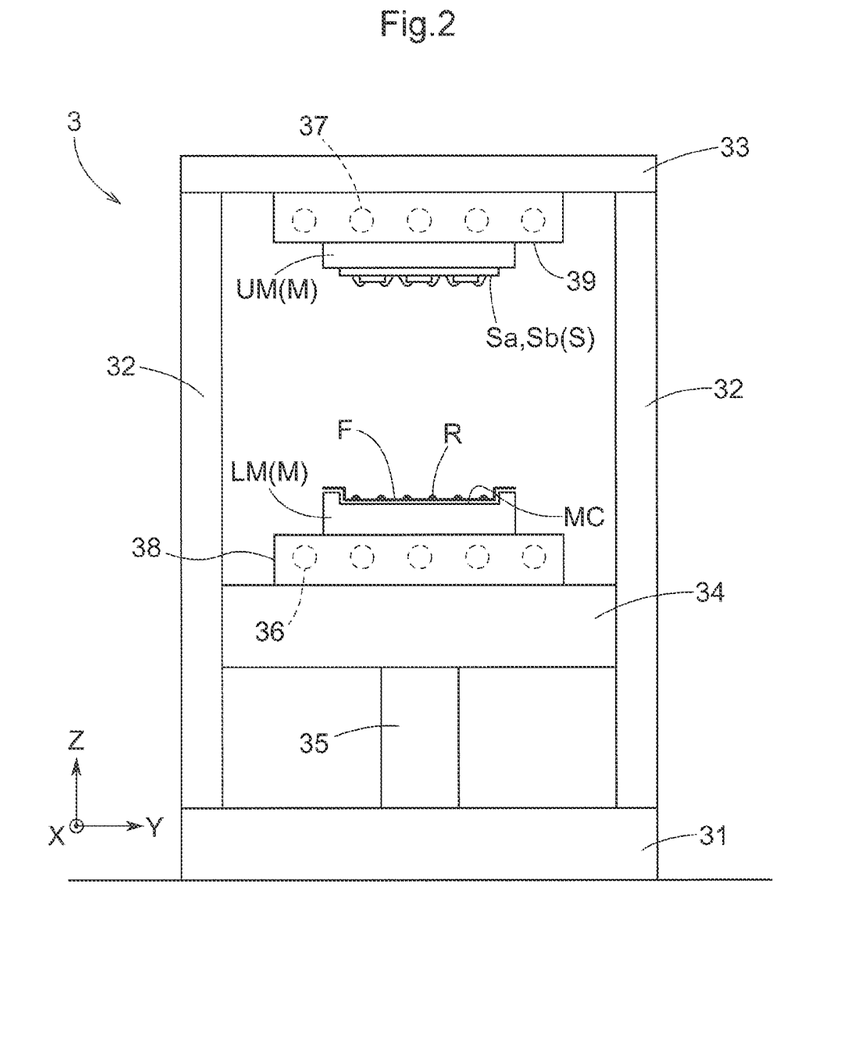
FIG. 2 is a diagram schematically illustrating a mold clamp mechanism.

As illustrated in FIG. 2, each compression-molding module 3 for the present embodiment includes a pressed frame including a lower fixed plate 31, an upper fixed plate 33, and plate-shaped members 32 by which the lower fixed plate 31 and the upper fixed plate 33 are integrated with each other. The compression-molding module 3 includes a movable platen 34 between the lower fixed plate 31 and the upper fixed plate 33. The movable platen 34 is movable in the up-down direction along the plate-shaped members 32. The compression-molding module 3 includes, over the lower fixed plate 31, a mold clamp mechanism 35 (such as a ball screw) configured to move the movable platen 34 upward and downward. The mold clamp mechanism 35 is capable of moving the movable platen 34 upward to clamp the mold die M and downward to open the mold die M. The mold clamp mechanism 35 may be driven by any driving source. The driving source may be, for example, an electric motor such as a servomotor (not illustrated in the drawings), but is not limited thereto.

The mold die M includes an upper die UM and a lower die LM made of, for example, metal and facing each other. The compression-molding module 3 includes, on the lower surface of the upper fixed plate 33, an upper-mold holder 39 including an upper heater 37. The upper-mold holder 39 has a lower surface to which the upper die UM is attached. The upper die UM includes, on its lower surface, an upper-mold substrate attachment section (not illustrated in the drawings) to which a substrate S is attachable that is provided with, for example, chips mounted thereon. The compression-molding module 3 includes, on the upper surface of the movable platen 34, a lower-mold holder 38 including a lower heater 36. The lower-mold holder 38 has an upper surface on which the lower die LM is provided. The lower die LM has a lower-mold cavity MC, into which a release film F is sucked by a suction mechanism (not illustrated in the drawings) and in which the release film F is then held. This allows liquid resin R applied onto the release film F by the resin supply mechanism 2A to be provided in the lower-mold cavity MC. The compression-molding module 3 causes the mold clamp mechanism 35 to clamp the mold die M and also causes the lower heater 36 to heat the lower die LM so that the liquid resin R in the lower-mold cavity MC is melted and cured. The compression-molding module 3, in other words, causes the mold clamp mechanism 35 to clamp the mold die M for resin sealing while a resin-sealing target substrate Sa and a release film F each as a supply target are placed between the upper die UM and the lower die LM. This allows the resin-sealing target substrate Sa to be sealed up in resin. The above operation allows, for example, chips mounted on a resin-sealing target substrate Sa (molding target substrate) to be sealed up in resin in the lower-mold cavity MC, thereby producing a resin-sealed substrate Sb (resin molded product). The description below uses the word "front" to refer to that side of the Y direction shown in FIG. 1 on which the mold die M is present and the word "back" to refer to that side of the Y direction on which the substrate loader 41 is present.

Figure 3:
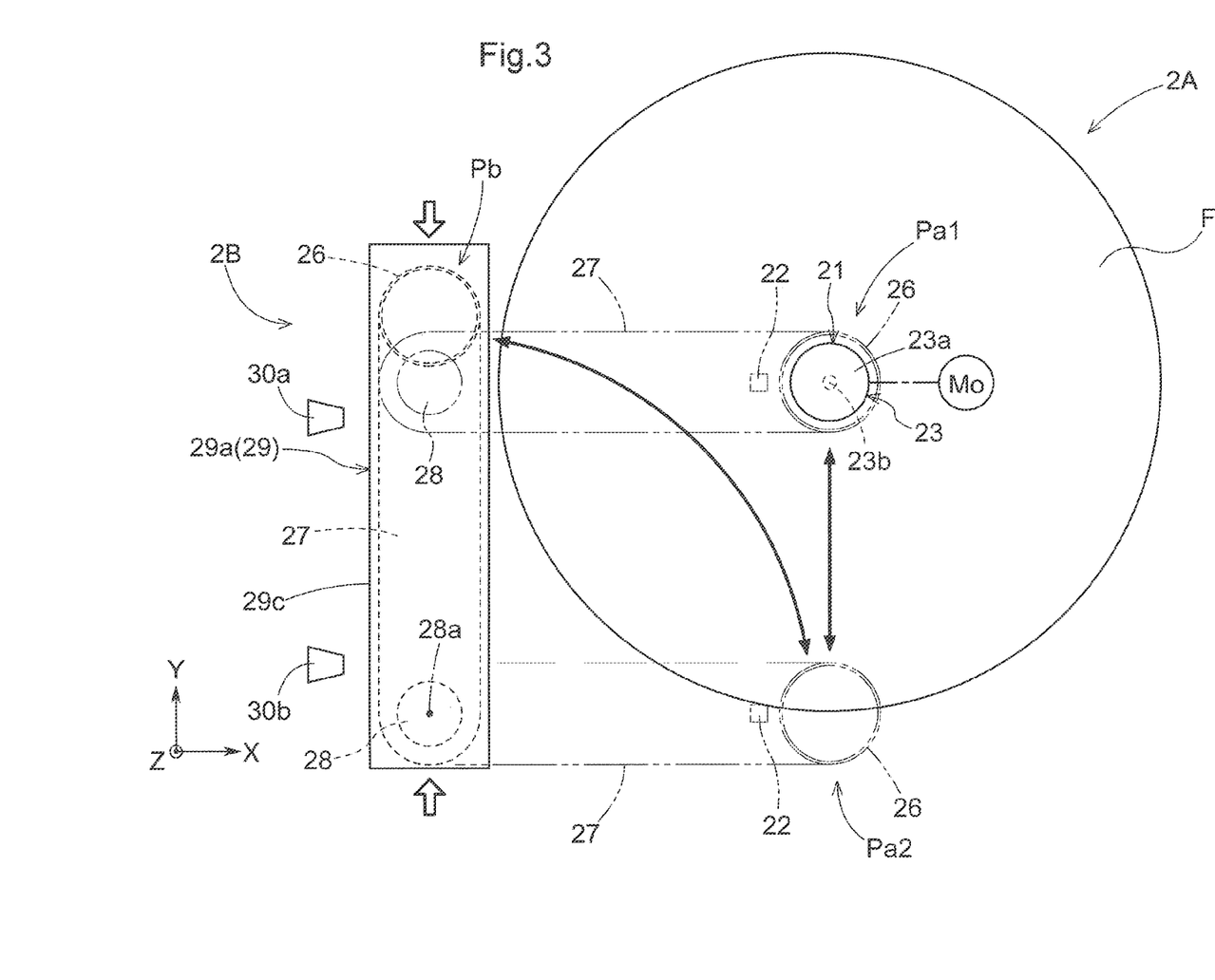
FIG. 3 is a diagram schematically illustrating a resin collection unit as viewed from above.
Figure 4:
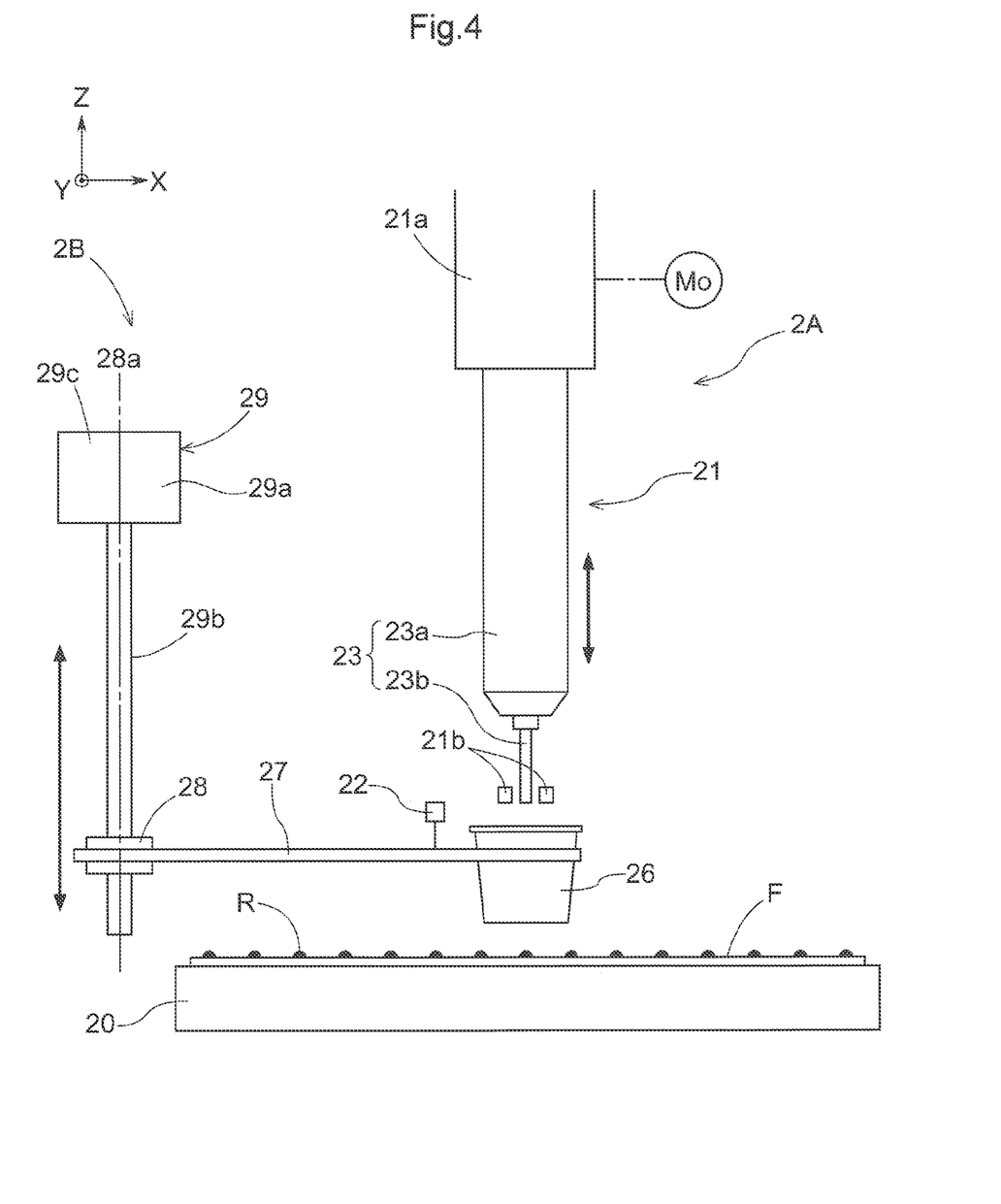
FIG. 4 is a diagram schematically illustrating a resin collection unit as viewed from a side.
Figure 5:
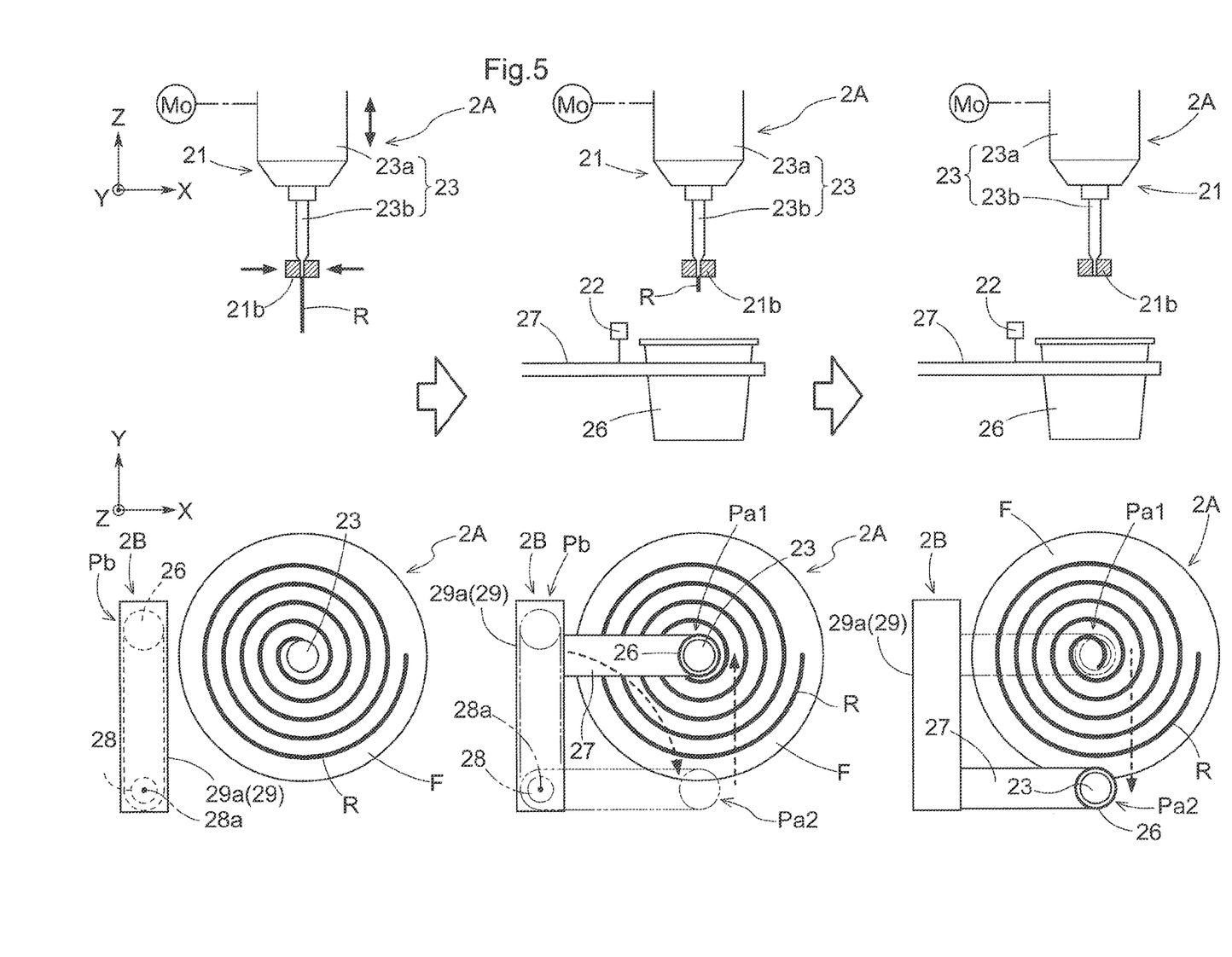
FIG. 5 provides diagrams schematically illustrating how to drain liquid resin remaining on a nozzle as viewed from a side and from above.

FIGS. 3 to 5 are diagrams schematically illustrating the resin supply mechanism 2A and the resin collection unit 2B. As described above, the resin collection unit 2B includes a resin-receiving cup 26, an arm 27, a rotation mechanism 28, and a movement mechanism 29. The resin collection unit 2B further includes a detection sensor 22 and position sensors 30a and 30b. The detection sensor 22 is configured to detect the nozzle 23b while the resin-receiving cup 26 is being moved by means of the operation of the movement mechanism 29. The position sensors 30a and 30b are configured to detect the position of the arm 27.

With reference to FIGS. 3 and 4, the resin-receiving cup 26 is a semitransparent, cylindrical cup with a bottom. The resin-receiving cup 26 has an internal space for containing resin which internal space has a bottom diameter larger than the outer diameter of a cartridge 23 in a plan view. The arm 27 has a shape of a long plate with a first end (one end) fixed to the rotation mechanism 28 and a second end (the other end) supporting the resin-receiving cup 26. The arm 27 is at a cup escape position Pb (which is an example of the "escape position"), which is outside the resin supply area of the release film F, when the resin supply mechanism 2A supplies liquid resin R onto a release film F. Actuating the rotation mechanism 28 allows the arm 27 to rotate between the cup escape position Pb and a nozzle escape position Pa2. The arm 27 has a length that allows the arm 27 to move in the resin supply area by means of the front-back movement mechanism 29a in such a manner as to follow the nozzle 23b after the resin supply mechanism 2A finishes supplying liquid resin R onto a release film F (described later). The present embodiment is arranged such that the resin supply area is circular in a plan view and that the nozzle 23b is moved in a straight line from the center of the circle to a position outside the circle after the resin supply mechanism 2A finishes supplying liquid resin R onto a release film F. The arm 27 thus has a length that allows the resin-receiving cup 26, which is supported by the second end of the arm 27, to move to the center of the resin supply area by means of the front-back movement mechanism 29a.

The rotation mechanism 28 is drivable by a driving source such as an electric motor or an air cylinder (not illustrated in the drawings) to rotate the arm 27 about the rotation axis 28a, as the first end of the arm 27 is fixed to the rotation mechanism 28 at the rotation axis 28a. The detection sensor 22 is provided at the second end of the arm 27 and in the vicinity of the resin-receiving cup 26. The detection sensor 22 is, for example, a publicly known laser sensor configured to detect the nozzle 23b through laser irradiation. The detection sensor 22, in other words, serves to determine whether the resin-receiving cup 26 is positioned under the nozzle 23b.

The movement mechanism 29 having a cylinder 29c includes a front-back movement mechanism 29a. The front-back movement mechanism 29a moves the arm 27 in a straight line in the front-back direction by means of the fluid pressure of, for example, air (which is an example of the "fluid") supplied into the cylinder 29c in the front-back direction. The front-back movement mechanism 29a causes the resin-receiving cup 26 to move in such a manner as to follow the nozzle 23b while keeping the resin-receiving cup 26 under the nozzle 23b. The front-back movement mechanism 29a for the present embodiment is configured to move the arm 27 in a straight line in the Y direction between a central position Pa1 and a nozzle escape position Pa2. The central position Pa1 (which is an example of the "first position" inside the resin supply area) is a position at which the front-back movement mechanism 29a positions the resin-receiving cup 26 under the nozzle 23b after the resin supply mechanism 2A finishes supplying liquid resin R onto a release film F. The nozzle escape position Pa2 (which is an example of the "second position" outside the resin supply area) is a position at which the front-back movement mechanism 29a positions the resin-receiving cup 26 under the nozzle 23b after the nozzle 23b escapes to outside the resin supply area of the release film F. The resin-receiving cup 26 is thus capable of rotating on an XY plane between the nozzle escape position Pa2 and the cup escape position Pb (escape position) and also moving on the XY plane in a straight line between the central position Pa1 and the nozzle escape position Pa2 to follow the nozzle 23b. The position sensors 30a and 30b are each, for example, a publicly known optoelectronic sensor configured to generate a signal in response to detecting the arm 27 and stop generating the signal in response to starting to fail to detect the arm 27. The position sensor 30a for the present embodiment is provided at the starting end of the path of the movement of the arm 27, corresponding to the resin-receiving cup 26 being at the central position Pa1. The position sensor 30b for the present embodiment is provided at the terminal end of the path of the movement of the arm 27, corresponding to the resin-receiving cup 26 being at the nozzle escape position Pa2.

FIG. 4 is a diagram schematically illustrating the resin collection unit 2B as viewed from a side when the resin-receiving cup 26 is at the central position Pa1. The movement mechanism 29, as illustrated in FIG. 4, further includes an up-down movement mechanism 29b configured to move the arm 27 upward and downward by means of the fluid pressure of, for example, air.

FIG. 5 provides diagrams schematically illustrating how to drain liquid resin R remaining on the nozzle 23b as viewed from a side (upper diagrams) and from above (lower diagrams). As illustrated in the upper middle diagram, when the nozzle 23b finishes supplying liquid resin R onto the resin supply area of a release film F, the clamp mechanism 21b blocks the tip of the nozzle 23b. At this stage, some liquid resin R may remain on the tip of the nozzle 23b in the form of a string or a lump. In view of that, when the resin supply mechanism 2A finishes supplying liquid resin R onto a release film F, the rotation mechanism 28 and the movement mechanism 29 cause the resin-receiving cup 26 to move to a position under the nozzle 23b so that the resin-receiving cup 26 can collect a resin remainder from the nozzle 23b. The resin remainder on the nozzle 23b refers to unnecessary liquid resin R dropping from the tip of the nozzle 23b after the resin supply mechanism 2A finishes supplying liquid resin R onto a release film F.

Next, as illustrated in the right diagrams in FIG. 5, the resin supply mechanism 2A is driven by the servomotor Mo to move the nozzle 23b to the nozzle escape position Pa2 to allow the nozzle 23b to escape from the resin supply area of the release film F, while the front-back movement mechanism 29a causes the resin-receiving cup 26 to move by means of the fluid pressure of air supplied into the cylinder 29c in such a manner as to follow the nozzle 23b while keeping the resin-receiving cup 26 under the nozzle 23b. During this operation, the control section 5 adjusts the fluid pressure of air to be supplied into the cylinder 29c so that the resin-receiving cup 26 moves at a speed equal to that of the movement of the nozzle 23b. The speed of the movement of the resin-receiving cup 26 is calculated in advance on the basis of the time length of the movement of the arm 27. The time length corresponds to the difference between (i) the time point at which the position sensor 30a detects the arm 27 at the starting end of its movement and (ii) the time point at which the other position sensor 30b detects the arm 27 at the terminal end of its movement (see also FIG. 3). The control section 5, in other words, adjusts the fluid pressure to be supplied into the cylinder 29c so that the arm 27 moves at a speed equal to that of the movement of the nozzle 23b, the speed of the movement of the arm 27 being calculated on the basis of the result of the detection by each of the position sensors 30a and 30b. Specifically, the control section 5 calculates a period of time T required to move the nozzle 23b from the central position Pa1 to the nozzle escape position Pa2 and adjusts the air pressure so that the arm 27 moves from the central position Pa1 to the nozzle escape position Pa2 in the period of time T. As described above, the movement of the arm 27 from the central position Pa1 to the nozzle escape position Pa2 is sensed by means of the sensors 30a and 30b.

As described above, the front-back movement mechanism 29a causes the resin-receiving cup 26 (which serves to receive liquid resin R) to move in such a manner as to follow the nozzle 23b while keeping the resin-receiving cup 26 under the nozzle 23b. The front-back movement mechanism 29a thereby allows the resin-receiving cup 26 to receive a resin remainder from the nozzle 23b as the nozzle 23b escapes from the resin supply area after the resin supply mechanism 2A finishes supplying liquid resin R onto a release film F. This prevents a resin remainder on the nozzle 23b from dropping onto the release film F so that liquid resin R is present on the release film F as intended. Further, after the clamp mechanism 21b blocks the nozzle 23b, the resin supply mechanism 2A causes the nozzle 23b to escape from the resin supply area of the release film F while the front-back movement mechanism 29a causes the resin-receiving cup 26 to receive a resin remainder from the nozzle 23b. This arrangement is efficient in that it not only prevents liquid resin R from remaining on the nozzle 23b in the form of a string, but also allows a resin remainder to be collected. In addition, even if the clamp mechanism 21b suffers from trouble and lets liquid resin R flow out, the resin-receiving cup 26 can collect such liquid resin R and prevent it from dropping onto the resin supply area.

[Method for Producing Resin-Molded Product]

The description below deals with a method for producing a resin molded product mainly with reference to FIG. 6.

First, the robot arm 45 takes a resin-sealing target substrate Sa from the first container section 43 and places it onto the substrate loader 41 (see also FIG. 1). The check mechanism then checks in which area chips and/or the like are present on the substrate S (resin-sealing target substrate Sa) as an object to be molded. The control section 5 calculates (or sets) an intended amount of supply of liquid resin R and an intended position of supply of liquid resin R (resin supply path) in the resin supply area of a release film F on the basis of at least, for example, the size of the substrate S as an object to be molded and/or the area in which chips and/or the like are present. The resin supply module 2 receives a release film F from the release-film cutting module 1, and causes the release film F to be held on the upper surface of the table 20 as the release film F is pulled by the suction mechanism. The resin supply mechanism 2A thus receives a release film F as a supply target (#61). Next, on the basis of the intended supply amount and intended supply position calculated as above, the control section 5 moves the dispenser unit 21a (to which a cartridge 23 is attached) of the resin supply mechanism 2A while causing liquid resin R to be supplied from the nozzle 23b onto the release film F (#62, resin supply step).

Next, after the nozzle 23b (dispenser unit 21a) finishes moving through the entire resin supply path, the control section 5 causes the nozzle 23b to move to a position directly above the central position Pa1. Then, the control section 5 causes the clamp mechanism 21b to block the nozzle 23b (see the upper left diagram in FIG. 5). Next, the control section 5 causes the dispenser unit 21a (nozzle 23b) to move upward and downward to cause liquid resin R remaining on the nozzle 23b to drop therefrom and drain. The control section 5 then determines whether the amount of liquid resin R on the release film F (as measured by the weight sensor 25) has reached the intended supply amount, that is, whether to finish supplying liquid resin R (#63). If the amount of liquid resin R on the release film F has not reached the intended supply amount (No in #63), the control section 5 causes the clamp mechanism 21b to open the nozzle 23b, and causes the resin supply mechanism 2A to supply, onto a central portion of the resin supply area of the release film F, liquid resin R in an amount equal to the difference between the intended supply amount and the current amount of liquid resin R on the release film F (that is, equal to the shortage of the resin supply amount) (#62). If the amount of liquid resin R on the release film F has reached the intended supply amount (Yes in #63), the control section 5 causes the resin supply mechanism 2A to finish supplying liquid resin R.

Immediately after the resin supply mechanism 2A finishes supplying liquid resin R, the control section 5 causes the rotation mechanism 28 to rotate the arm 27, to which the resin-receiving cup 26 is attached, from the cup escape position Pb (escape position) to the nozzle escape position Pa2 (second position), and then causes the front-back movement mechanism 29a to move the arm 27 in a straight line from the nozzle escape position Pa2 to the central position Pa1, that is, a position under the nozzle 23b (#64; see the middle diagrams in FIG. 5). During this operation, the control section 5 may cause the dispenser unit 21a or the up-down movement mechanism 29b to adjust the height of the nozzle 23b or the arm 27 as necessary to prevent the resin-receiving cup 26 from colliding with the nozzle 23b. The notification section 6 notifies the operator of a malfunction of the resin collection unit 2B if the resin-receiving cup 26 is not under the nozzle 23b as determined with use of the detection sensor 22.

Next, the control section 5 causes the front-back movement mechanism 29a to move the arm 27 (to which the resin-receiving cup 26 under the nozzle 23b is attached) in a straight line from the central position Pa1 (which is inside the resin supply area) to the nozzle escape position Pa2 (which is outside the resin supply area) in such a manner as to follow the nozzle 23b as the resin supply mechanism 2A is driven by the servomotor Mo to move the nozzle 23b (#65, resin collection step; see the right diagrams in FIG. 5). When the front-back movement mechanism 29a moves the arm 27 as above, the control section 5 calculates the speed of the movement of the resin-receiving cup 26 on the basis of the difference between (i) the time point at which the position sensor 30a detects the arm 27 at the starting end of its movement and (ii) the time point at which the other position sensor 30b detects the arm 27 at the terminal end of its movement. The control section 5 then adjusts in advance the fluid pressure of air to be supplied into the cylinder 29c so that the resin-receiving cup 26 moves at a speed equal to that of the movement of the nozzle 23b (see FIG. 3) so that the resin-receiving cup 26 follows the nozzle 23b. This prevents a resin remainder on the nozzle 23b from unintentionally dropping therefrom onto the release film F during the movement of the nozzle 23b. The notification section 6 notifies the operator of a malfunction of the resin collection unit 2B if the front-back movement mechanism 29a causes the resin-receiving cup 26 to move at a speed outside a predetermined range. The notification section 6 also notifies the operator of a malfunction of the resin collection unit 2B if the resin-receiving cup 26 is not under the nozzle 23b as determined with use of the detection sensor 22. After the nozzle 23b reaches the nozzle escape position Pa2, the control section 5 causes the rotation mechanism 28 to rotate the arm 27 to the cup escape position Pb (#66). Specifically, the control section 5 causes the rotation mechanism 28 to rotate the arm 27, to which the resin-receiving cup 26 is attached, from the nozzle escape position Pa2 (second position) to the cup escape position Pb (escape position).

Next, as illustrated in FIGS. 1 and 2, the control section 5 causes the substrate loader 41 to attach the resin-sealing target substrate Sa to the upper die UM. The control section 5 then causes the film loader 12 to hold the release film F on which liquid resin R has been supplied, convey the release film F to the compression-molding modules 3, and place the release film F onto the lower die LM. The control section 5, in other words, causes the resin-sealing target substrate Sa to be set on the upper die UM and the release film F to be set on the lower die LM. Then, the control section 5 causes the mold clamp mechanism 35 to clamp the upper die UM and the lower die LM together to produce a resin-sealed substrate Sb (#67, resin molding step). After resin molding is completed, the control section 5 causes the substrate loader 41 to convey the resin-sealed substrate Sb from the compression-molding module 3 to the conveying module 4, and causes the robot arm 45 to receive the resin-sealed substrate Sb from the substrate loader 41 and store the resin-sealed substrate Sb into the second container section 44 (see FIG. 1). The control section 5 then determines whether to repeat the resin-molding operation (#68). If the control section 5 repeats the operation (Yes in #68), the control section 5 performs steps #61 to #67 again. If the control section 5 does not repeat the operation (No in #68), the control section 5 ends the procedure.

Alternative Embodiments

For ease of understanding, the description below uses the same terms and reference signs as in the description of the above embodiment for similar elements.

1. The embodiment described above includes a bottomed, cylindrical resin-receiving cup 26 as a resin-receiving member. The resin-receiving member may, however, be any member (for example, a plate-shaped member) capable of receiving a resin remainder from the nozzle 23b. The resin-receiving cup 26 may be inclined to prevent a string-shaped resin remainder on the nozzle 23b from sticking to the side surface of the resin-receiving cup 26. The resin-receiving cup 26 may include, for example, a flange at a lower portion thereof for preventing liquid resin R from dropping from the side surface of the resin-receiving cup 26.
2. The embodiment described above is arranged such that the resin supply mechanism 2A and the resin collection unit 2B are driven separately by their respective driving sources. The resin supply mechanism 2A and the resin collection unit 2B may, however, alternatively be driven together by, for example, a single electric motor. In this case, the ejection mechanism 21 and the resin-receiving cup 26 are preferably adjacent to each other to allow the resin molding apparatus D to be compact.
3. The embodiment described above is arranged such that the rotation axis 28a is on the front side and that the cup escape position Pb for the resin-receiving cup 26 is on the back side. The embodiment may, however, be altered such that the rotation axis 28a is on the back side and that the cup escape position Pb for the resin-receiving cup 26 is on the front side. This alternatively arrangement allows the rotation mechanism 28 to move the resin-receiving cup 26 from the cup escape position Pb (escape position) to the central position Pa1 (first position) through a single path, thereby simplifying the movement of the arm 27.
4. The embodiment described above is arranged such that after the resin supply mechanism 2A finishes supplying liquid resin R onto a release film F, the front-back movement mechanism 29a places the resin-receiving cup 26 at a position under the nozzle 23b and then moves the arm 27, to which the resin-receiving cup 26 is attached, in a straight line in the Y direction in such a manner as to follow the nozzle 23b. The embodiment may, however, be altered such that the front-back movement mechanism 29a places and moves the resin-receiving cup 26 in such a manner as to follow the nozzle 23b at a stage during the resin supply operation at the time of draining liquid resin R remaining on the nozzle 23b. If, for instance, the resin supply mechanism 2A is to supply liquid resin R onto a release film F in a discontinuous pattern, the movement mechanism 29 may cause the arm 27, to which the resin-receiving cup 26 is attached, to move in such a manner as to follow the nozzle 23b when the dispenser unit 21a (nozzle 23b) moves from one resin supply position to another. Further, if the resin supply mechanism 2A is to supply liquid resin R onto a release film F in a plurality of lines parallel to one another, the front-back movement mechanism 29a may cause the arm 27, to which the resin-receiving cup 26 is attached, to move in a straight line in the Y direction from the ending point of one line to the starting point of another line.
5. The embodiment described above may be altered such that the up-down movement mechanism 29b causes the arm 27, to which the resin-receiving cup 26 is attached, to move upward and downward in such a manner as to follow the dispenser unit 21a (nozzle 23b) as the dispenser unit 21a moves upward and downward, that is, in such a manner as to keep a constant distance between the nozzle 23b and the resin-receiving cup 26. Keeping a constant distance between the nozzle 23b and the resin-receiving cup 26 with use of the up-down movement mechanism 29b as such can reliably prevent liquid resin R from unintentionally being splattered outside the resin-receiving cup 26 onto the release film F when the nozzle 23b is moved upward and downward to drain a resin remainder.
6. The embodiment described above is arranged such that the ejection mechanism 21 of the resin supply mechanism 2A is oriented vertically (in the Z direction). The ejection mechanism 21 may, however, alternatively be oriented horizontally (in the Y direction).
7. The embodiment described above is arranged such that the movement mechanism (front-back movement mechanism 29a) causes a resin-receiving member (resin-receiving cup 26) to move in a straight line between a first position inside the resin supply area (central position Pa1) and a second position outside the resin supply area (nozzle escape position Pa2) as illustrated in FIG. 3. The first position may be any position inside the resin supply area. The second position may similarly be any position outside the resin supply area. The front-back movement mechanism 29a may alternatively cause the resin-receiving member to move in an arc or in a meandering pattern instead of in a straight line to follow the nozzle 23b.
8. The embodiment described above includes a release-film cutting module 1 and a resin supply module 2 as two separate modules. The embodiment may, however, alternatively include a single module, that is, a resin supply module 2 containing a release-film cutting mechanism.
9. The substrate S for this disclosure may have any shape such as a circle or a rectangle. Further, the substrate S may have any size, but is preferably large (for example, with a diameter of 300 mm, or 300 mm by 300 mm) to have a large area for supply of liquid resin R and allow the ejection mechanism 21 of the resin supply mechanism 2A to move over a long distance.
10. The embodiment described above is based on the die-down compression method. The embodiment may, however, alternatively be based on the die-up compression method, where an object to be molded such as a substrate is the supply target (that is, an object to which the resin supply mechanism 2A supplies resin). The embodiment may further be altered to omit a release film F and arranged such that the mold die M is the supply target (that is, an object to which the resin supply mechanism 2A supplies resin).

Summary of Above Embodiment

The description below summarizes the resin molding apparatus D and the method for producing a resin molded product each described above as an embodiment.

(1) The resin molding apparatus D characteristically includes: a resin supply mechanism 2A including a nozzle 23b for ejecting liquid resin R to a supply target (release film F); a resin collection unit 2B including: a resin-receiving member (resin-receiving cup 26) configured to receive a portion of the liquid resin R which portion has unintentionally dropped from the nozzle 23b; and a movement mechanism 29 (specifically, a front-back movement mechanism 29a included therein) configured to cause the resin-receiving member to move in such a manner as to follow the nozzle 23b while keeping the resin-receiving member under the nozzle 23b; a mold die M including an upper die UM and a lower die LM facing the upper die UM; a mold clamp mechanism 35 configured to clamp the mold die M with the supply target between the upper die UM and the lower die LM; and a control section 5 configured to control at least the respective operations of the resin supply mechanism 2A and the resin collection unit 2B.

Liquid resin R with a higher viscosity remains on the nozzle 23b in the shape of a string for a longer time period after the resin supply mechanism 2A stops supplying the liquid resin R onto a release film F. Such a resin remainder on the nozzle 23b more likely drops therefrom onto a release film F to cause irregularity in how liquid resin is present on the release film F (that is, the amount and position of resin supply). With the above arrangement, the front-back movement mechanism 29a causes the resin-receiving cup 26 (which serves to receive liquid resin R) to move in such a manner as to follow the nozzle 23b while keeping the resin-receiving cup 26 under the nozzle 23b. The front-back movement mechanism 29a thereby allows the resin-receiving cup 26 to receive a resin remainder from the nozzle 23b as the nozzle 23b escapes from the resin supply area after the resin supply mechanism 2A stops supplying liquid resin R onto a release film F. This prevents a resin remainder on the nozzle 23b from dropping onto the release film F so that liquid resin R is present on the release film F as intended. The above arrangement thus allows the resin molding apparatus D to supply liquid resin R onto a supply target accurately.

(2) The resin molding apparatus may be arranged such that the resin collection unit 2B further includes an arm 27 configured to hold the resin-receiving member (resin-receiving cup 26), the resin supply mechanism 2A further includes a motor (servomotor Mo) configured to drive the nozzle 23b to move, the movement mechanism 29 (front-back movement mechanism 29a) includes a cylinder 29c configured to receive a fluid, and the arm 27 is moved by means of the fluid pressure of the fluid to move the resin-receiving member.

The above arrangement allows the arm 27 holding the resin-receiving cup 26 to be moved by means of the fluid pressure of a fluid supplied into the cylinder 29c, independently of how the servomotor Mo of the resin supply mechanism 2A is operated. This allows the resin collection unit 2B to be retrofitted. Further, the above form of driving the arm 27 (that is, by means of a fluid pressure) allows the resin collection unit 2B to be produced inexpensively.

(3) The resin molding apparatus may be arranged such that the resin collection unit 2B further includes a rotation mechanism 28 configured to rotate the arm 27, the movement mechanism 29 (in particular, the front-back movement mechanism 29a) causes the resin-receiving member (resin-receiving cup 26) to move in a straight line between a first position inside the resin supply area (central position Pa1) and a second position outside the resin supply area (nozzle escape position Pa2), and the rotation mechanism 28 rotates the arm 27 to cause the resin-receiving member to move between an escape position (cup escape position Pb) and the first position or the second position.

With the above arrangement, operating the rotation mechanism 28 and/or the front-back movement mechanism 29a causes the resin-receiving cup 26 to move to the central position Pa1, the nozzle escape position Pa2, or the cup escape position Pb. This allows the resin-receiving cup 26 at the cup escape position Pb to be moved rapidly to a position under the nozzle 23b inside the resin supply area (central position Pa1) after the resin supply mechanism 2A finishes supplying liquid resin R. The above arrangement thereby allows a resin remainder on the nozzle 23b to be collected reliably.

(4) The resin molding apparatus may be arranged such that the resin collection unit 2B further includes at least two position sensors 30a and 30b, a first one of which is present at the starting end of the path of the movement of the arm 27 and a second one of which is present at the terminal end of the path of the movement of the arm 27, and the control section 5 adjusts the fluid pressure so that the resin-receiving member (resin-receiving cup 26) is moved at a speed equal to the speed of the movement of the nozzle 23b, the speed of the movement of the resin-receiving cup 26 being calculated on the basis of the result of detection by the position sensors 30a and 30b.

The above arrangement allows the fluid pressure to be adjusted so that the resin-receiving cup 26 is moved at a speed equal to the speed of the movement of the nozzle 23b, the speed of the movement of the resin-receiving cup 26 being calculated on the basis of the result of detection by the position sensors 30a and 30b. Supposing that the nozzle 23b is constantly moved at a predetermined speed when escaping to outside the resin supply area, the above arrangement allows the resin-receiving cup 26 to be kept under the nozzle 23b in a simple control form.

(5) The resin molding apparatus may be arranged such that the resin collection unit 2B further includes a detection sensor 22 configured to detect the nozzle 23b during the movement of the resin-receiving member (resin-receiving cup 26).

The above arrangement allows the detection sensor 22 to detect the nozzle 23b while the front-back movement mechanism 29a is being operated. This in turn allows the resin-receiving cup 26 to reliably receive a resin remainder from the nozzle 23b.

(6) A method for producing a resin molded product with use of the above resin molding apparatus characteristically includes: supplying the liquid resin R to the supply target (release film F) with use of the resin supply mechanism 2A; collecting, with use of the resin collection unit 2B, a portion, if any, of the liquid resin R which portion has unintentionally dropped from the nozzle 23b after the supplying; and producing a resin molded product with use of the liquid resin R supplied with use of the resin supply mechanism 2A.

The above method allows a resin remainder from the nozzle 23b to be collected with use of the resin collection unit 2B. This presents a resin remainder on the nozzle 23b from unintentionally dropping therefrom onto a release film F, thereby allowing the liquid resin R to be present on the release film F as intended (in terms of the amount and position of resin supply). With the above arrangement, the method for producing a resin molded product allows liquid resin R to be supplied onto a supply target accurately.

This disclosure provides a resin molding apparatus and a method for producing a resin molded product each of which allows liquid resin to be supplied to a supply target accurately.

The invention claimed is:

1. A resin molding apparatus, comprising:
    a resin supply mechanism including a nozzle for ejecting liquid resin to a resin supply area of a supply target;
    a resin collection unit including a resin-receiving member configured to receive a portion of the liquid resin which portion has dropped from the nozzle;
    a movement mechanism configured to cause the resin-receiving member to follow the nozzle while keeping the resin-receiving member under the nozzle;
    a mold die including an upper die and a lower die facing the upper die;
    a mold clamp mechanism configured to clamp the mold die with the supply target between the upper die and the lower die; and
    a control section configured to control at least respective operations of the resin supply mechanism and the resin collection unit, wherein
    the resin collection unit further includes an arm configured to hold the resin-receiving member,
    the resin supply mechanism further includes a motor configured to drive the nozzle to move,
    the movement mechanism includes a cylinder configured to receive a fluid,
    the arm is moved by pressure of the fluid to move the resin-receiving member from a first position to a second position,
    the resin collection unit further includes a rotation mechanism configured to rotate the arm,
    the movement mechanism causes the resin-receiving member to move in a straight line between the first position inside the resin supply area and the second position outside the resin supply area,
    the rotation mechanism rotates the arm to cause the resin-receiving member to move between an escape position and the first position or the second position, and
    immediately after finishing supplying liquid resin, the resin collection unit causes the resin-receiving member to move under the nozzle at the first position in the resin supply area, and causes the resin-receiving member to move to the second position outside the resin supply area in such manner to follow the nozzle while preventing the liquid resin from dropping from the nozzle onto the resin supply area,
    wherein the movement mechanism is additionally configured to move the arm upwardly and downwardly.

2. The resin molding apparatus according to claim 1, wherein
    the resin collection unit further includes at least two position sensors, a first one of which is present at a starting end of a path of the movement of the arm and a second one of which is present at a terminal end of the path of the movement of the arm, and
    the control section adjusts the fluid pressure so that the resin-receiving member is moved at a speed equal to a speed of the movement of the nozzle, the speed of the movement of the resin-receiving member being calculated on a basis of a result of detection by the position sensors.

3. A method for producing a resin molded product with use of a resin molding apparatus according to claim 2, the method comprising:
    supplying the liquid resin to the supply target with use of the resin supply mechanism;
    collecting, with use of the resin collection unit, a portion, if any, of the liquid resin which portion has dropped from the nozzle after the supplying; and
    producing a resin molded product with use of the liquid resin supplied with use of the resin supply mechanism.

4. The resin molding apparatus according to claim 1, wherein
    the resin collection unit further includes a detection sensor configured to detect the nozzle during the movement of the resin-receiving member.

5. A method for producing a resin molded product with use of a resin molding apparatus according to claim 4, the method comprising:
    supplying the liquid resin to the supply target with use of the resin supply mechanism;
    collecting, with use of the resin collection unit, a portion, if any, of the liquid resin which portion has dropped from the nozzle after the supplying; and
    producing a resin molded product with use of the liquid resin supplied with use of the resin supply mechanism.

6. A method for producing a resin molded product with use of a resin molding apparatus according to claim 1, the method comprising:
    supplying the liquid resin to the supply target with use of the resin supply mechanism;
    collecting, with use of the resin collection unit, a portion of the liquid resin which portion has dropped from the nozzle after the supplying; and
    producing a resin molded product with use of the liquid resin supplied with use of the resin supply mechanism.

7. The resin molding apparatus according to claim 1, wherein the control section is additionally configured to move the nozzle upwardly and downwardly.

8. The resin molding apparatus according to claim 1, wherein the resin-receiving member is in the shape of a cup.

* * * * *